United States Patent Office 3,636,061
Patented Jan. 18, 1972

3,636,061
PROCESS FOR THE PREPARATION OF
EPOXYPHOSPHONATES
Richard J. Turley, Derby, Conn., assignor to
Olin Corporation
No Drawing. Filed Nov. 21, 1969, Ser. No. 878,926
Int. Cl. C07f 9/38
U.S. Cl. 260—348                                    7 Claims

ABSTRACT OF THE DISCLOSURE

An improved method for preparing 1,2-epoxyalkyl phosphonates useful for flame retardants in plastics, especially polyurethanes, condenses dialkyl phosphites with alpha-haloketones using alkali metal alcoholates in lower aliphatic alcohols as reagent.

---

This invention relates to an improved method for preparing dialkyl 1,2-epoxyalkyl phosphonates by condensing dialkyl phosphites with alpha-haloketones using alkali metal alkoxides in lower aliphatic alcohols as reagent. The reaction is exemplified by the following equation:

$(C_2H_5O)_2PO.H + ClCH_2COCH_3 + NaOCH_3 \longrightarrow$

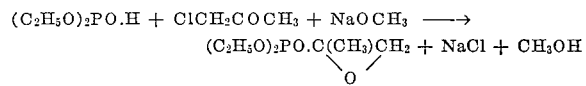
$(C_2H_5O)_2PO.C(CH_3)CH_2 + NaCl + CH_3OH$

The products have been prepared using other methods, usually in two steps and in poor yields by Arbuzov and other Russian authors. See Chem. Abstr. 51, 8001; 51, 9473; 53, 15035; 54, 24454; 59, 813 and 59, 15306. In contrast, these products are obtained by the process of this invention in better yields, better quality and in one step.

According to the process of the present invention, substantially equimolar proportions of dialkyl phosphite, alpha-haloketone and alkali metal alkoxide are mixed at room temperatures or lower, suitably zero to 35° C. in a lower aliphatic alcohol having up to 6 carbons. The instantaneous reaction is highly exothermic and cooling is usually required. Advantageously the reaction mixture is neutralized with carbon dioxide gas, precipitated salts are removed, suitably by filtration and the alcohol is removed by distillation, evaporation or dilution with water. The recovered 1,2-epoxyalkyl phosphonate is preferably distilled. Yields vary but range up to 95 percent and are improved over prior art methods.

In the process of the invention suitable dialkyl phosphites include substituted and unsubstituted dialkyl phosphites, for example, dimethyl phosphite, diethyl phosphite, diisopropyl phosphite, di-n-butyl phosphite, bis(2-ethylhexyl) phosphite, bis(2-chloroethyl) phosphite, bis(2-bromoethyl) phosphite and other alkyl and haloalkyl phosphites having 1 to 12 carbons in each alkyl group. Mixed alkyl phosphites and mixtures of alkyl phosphites are suitably used.

Sutiable alpha-haloketones are aliphatic or cyclo aliphatic and suitably have aromatic substituents, for example, chloroacetone, bromoacetone, 2-chlorocyclohexanone, 2-chloro-2-methylcyclohexanone, 2-chlorocyclopentanone, phenacyl chloride, phenacyl bromide, p-chlorophenacyl bromide and other alpha-haloketones having 3 to 12 carbons. Mixtures of alpha-haloketones are suitably used. The halogen is suitably chlorine or bromine.

The alkoxides of the alkali metals are used as condensing agents but sodium and potassium alkoxides are most convenient. The alkoxides of any of the saturated aliphatic alcohols having 1 to 6 carbons are suitable. Examples include sodium methoxide, sodium ethoxide, sodium isopropoxide and potassium tertiary butoxide. Suitably excess alcohol used in preparing the alkali metal alkoxide serves as reaction medium. Preferably the alkoxide is derived from the same alcohol as the dialkyl phosphite but under the mild conditions of reaction of the process of this invention there appears to be little if any interchange involving the alkyl groups of the phosphite and the use of mixtures leads to no adverse results. The alkoxide and alcohol do not necessarily have the same alkyl group.

Substantially stoichiometric proportions of 1:1:1 of dialkyl phosphite, alpha-haloketone and alkali metal alkoxide are suitably used. This is not critical and variations of 10 percent are satisfactory although yields may not be improved thereby.

The dialkyl 1,2-epoxyalkyl phosphonates are useful as such in known polyurethane foam formulations. They are non-fugitive in humid or dry heat aging of the resulting foams and permanently confer flame retardant properties. These phosphonates are also reactive with polyols, for example, glycerol, to form phosphorus and/or chlorine-containing polyols which are advantageously incorporated as part of the polyol component of polyurethane foams.

EXAMPLE I

Diethyl 1,2-epoxypropyl 2-phosphonate

A well-stirred solution of 34.5 g. (0.25 mole) of diethyl phosphite and 24.0 g. (0.26 mole) of chloroacetone in 75 ml. of absolute ethanol was treated dropwise with a solution of sodium ethoxide in ethanol prepared from 5.7 g. (0.25 mol) of sodium metal dissolved in 125 ml. of absolute ethanol.

The reaction mixture was cooled in an ice-bath and the rate of addition of base was adjusted to maintain temperatures at 8 to 12° C. The addition of base was accompanied by a strong exotherm in the reaction mixture for the first 4 to 5 ml. The remainder of the base solution was added more rapidly. After the addition of sodium ethoxide solution was completed, the reaction mixture was stirred for 0.5 hour at room temperature. Carbon dioxide was passed through the mixture for about 15 minutes to neutralize excess base. The mixture was filtered free of precipitated salt and the filtrate was evaporated to a liquid residue. Chloroform was added to the residue and the additional precipitated salt was removed by filtration. Removal of solvent and distillation of the residue yielded 45.8 g. (94.4 percent) of colorless distillate boiling at 85–95° C. at 0.6 mm. pressure; $n_D^{23}$ 1.4303. The distillate was redistilled through a short Vigreux column to give 39.7 g. (81.9 percent) of an analytical sample of diethyl 1,2-epoxypropyl 2-phosphonate collected at 93–94° C./0.65 mm.; $n_D^{26}$ 1.4291.

Calcd. for $C_7H_{15}O_4P$ (percent): C, 43.30; H, 7.73; P, 15.98. Found (percent): C, 43.29; H, 7.58; P, 16.01.

V.p.c. analysis of this compound showed the absence of other material. The presence of the epoxide group was indicated by absorption at 11.7 and 12.5 in the infrared spectrum. The epoxide group was further verified by the formation of the known diethyl 1-chloro-2-hydroxypropyl 2-phosphonate by reaction of the above product with hydrogen chloride in hexane solvent.

EXAMPLE II

Dimethyl 1,2-epoxypropyl 2-phosphonate

A solution of sodium methoxide in absolute methanol (0.25 mole of sodium) was added dropwise to a well-stirred solution of dimethyl phosphite (0.25 mole) and chloroacetone (0.26 mole) in absolute methanol at ice-bath temperature. After addition was complete, the mixture was saturated with carbon dioxide and the salt precipitate was removed by filtration. The mixture was further worked up as described in Example 1. Distillation gave a 92.3 percent yield of colorless distillate boiling at 82–92° C. at 0.65 mm. Redistillation through a short glass bead packed column gave a 73 percent yield of analytically pure dimethyl 1,2-epoxypropyl 2-phosphonate boiling at 85–88° C./0.6 mm., $n_D^{25}$ 1.4308.

Calcd. for $C_5H_{11}O_4P$ (percent): C, 36.14; H, 6.63; P, 18.67. Found (percent): C, 36.42; H, 6.60; P, 18.57.

EXAMPLE III

Diisopropyl 1,2-epoxypropyl 2-phosphonate

An equimolar solution of diisopropyl phosphite and chloroacetone was treated dropwise with a solution of sodium ethoxide in ethanol at 10–14° C. The product of the reaction was isolated as described above to give an 87 percent yield of colorless distillate boiling at 87–95° C./0.6 mm. Redistillation through a short Vigreux column gave a 60 percent yield of analytically pure diisopropyl 1,2-epoxypropyl 2-phosphonate boiling at 93–4° C./0.6 mm.; $n_D^{23}$ 1.4263.

Calcd. for $C_9H_{19}O_4P$ (percent): C, 48.65; H, 8.56; P, 13.96. Found (percent): C, 48.43; H, 8.41; P, 13.98.

EXAMPLE IV

Di-n-butyl 1,2-epoxypropyl 2-phosphonate

The procedure of Example III was repeated using equimolar amounts of di-n-butyl phosphite, chloroacetone and sodium ethoxide in ethanol as solvent. An initial 94.1 percent yield of material was obtained by a simple distillation at 111–127° C./0.5 mm. An analytical sample of di-n-butyl 1,2-epoxypropyl 2-phosphonate was obtained in 67 percent yield by redistillation at 125–6° C./0.5 mm.; $n_D^{21}$ 1.4371.

Calcd. for $C_{11}H_{23}O_4P$ (percent): C, 52.80; H, 9.20; P, 12.40. Found (percent): C, 52.94; H, 9.09; P, 12.33.

EXAMPLE V

Bis(2-ethylhexyl) 1,2-epoxypropyl 2-phosphonate

The procedure of Example III was repeated using equimolar amounts of di(2-ethylhexyl) phosphite, chloroacetone and sodium ethoxide in ethanol as solvent. A first distillation at 184–203° C. at 0.7 mm. gave a 66.3 percent yield of product; $n_D^{22}$ 1.4459. A subsequent careful distillation gave 35 percent yield of light yellow bis (2-ethylhexyl) 1,2-epoxypropyl 2-phosphonate boiling at 180–187° C./0.6 mm.; $n_D^{25}$ 1.4454.

EXAMPLE VI

Bis(2-chloroethyl) 1,2-epoxypropyl 2-phosphonate

The procedure of Example III was repeated using equimolar amounts of bis(2-chloroethyl) phosphite, chloroacetone and sodium ethoxide in ethanol as solvent. Bis(2-chloroethyl) 1,2-epoxypropyl 2-phosphonate was obtained in a 44 percent yield as a colorless distillate boiling at 96–123° C./0.03 mm.; $n_D^{22}$ 1.4646. Redistillation afforded material boiling at 110° C./0.03 mm.; $n_D^{21}$ 1.4672.

Calcd. for $C_7H_{13}Cl_2O_4P$ (percent): Cl, 27.00; P, 11.79. Found (percent): Cl, 28.05; P, 11.99.

EXAMPLE VII

Bis(2-chloroethyl) 1,2-epoxypropyl 2-phosphonate

The procedure of Example VI was repeated using the equivalent amount of sodium isopropoxide in isopropanol as solvent. The yield of bis(2-chloroethyl) 1,2-epoxypropyl 2-phosphonate was 78 percent of product boiling at 107–122° C./0.05 mm.; $n_D^{22}$ 1.4698. Redistillation gave a light yellow product collected at 110–112° C./0.03 mm.; $n_D^{22}$ 1.4712.

EXAMPLE VIII

Repetition of the procedure of Example III using the equivalent amount of bromoacetone in place of chloroacetone yields the same diisopropyl 1,2-epoxypropyl 2-phosphonate.

EXAMPLE IX

Repetition of the procedure of Example III using equivalent amounts of diisopropyl phosphite, phenacyl bromide and sodium ethoxide in ethanol yields diisopropyl 1-phenyl-1,2-epoxyethyl 1-phosphonate.

EXAMPLE X

In a typical foam formulation, 25 to 30 g., of the phosphonate additive was blended at ambient temperature with 100 g. of a 3000 molecular weight triol derived from glycerol and propylene oxide. A total of 1.5 ml. of polysiloxane polyalkylene glycol ester surfactant, 0.5 ml. of triethylene diamine catalyst and 4 ml. of water was then blended into the polyol solution. A total of 0.6 ml. of 50 percent stannous octoate catalyst was added to the mixture, then 42.5 ml. of toluene diisocyanate (an 80/20 mixture of the 2,4 and 2,6 isomers) was added. The isocyanate-polyol mixture was rapidly stirred for about 10 seconds. The formulation was then poured into an open box, whereupon foaming of the reaction mixture occurred. The flexible foam samples thus obtained were oven-cured at about 95° C. for about 10 minutes, then cured further at ambient temperature for about two days. The flammability of the foams was tested as described in ASTM-D1692–59T. The following table presents the results of the flammability tests.

| Product of Example No. | Grams | Results of tests [a] | |
|---|---|---|---|
| | | Unaged | Humid aged [b] |
| VI | 20 | SE 2.0 | |
| VI | 30 | SE 1.5 | SE 1.4 |
| I | 20 | B 3.7 | |

[a] SE = Self-extinguishing; B = Burns; figures denote inches burned.
[b] The humid aging was conducted at 121° C. in a steam autoclave for 5 hours.

What is claimed is:

1. Method for preparing dialkyl 1,2-epoxyalkyl phosphonates by contacting dialkyl phosphite, alpha-haloketone and alkali metal alkoxide in solution in absolute lower aliphatic alcohol to form a reaction mixture containing dialkyl 1,2-epoxyalkyl phosphonate and separating said dialkyl 1,2-epoxyalkyl phosphonate from said reaction mixture.

2. Method as claimed in claim 1 in which the molar ratio of said dialkyl phosphite, alpha-haloketone and alkali metal alkoxide is substantially 1:1:1.

3. Method as claimed in claim 1 in which said reaction mixture is neutralized by introducing carbon dioxide gas, salts are separated from said reaction mixture and said dialkyl 1,2-epoxyalkyl phosphonate is separated from the resulting salt-free reaction mixture.

4. Method as claimed in claim 1 in which said dialkyl phosphite has 1 to 12 carbons in each alkyl group.

5. Method as claimed in claim 1 in which said alpha-haloketone has 3 to 12 carbons and the halogen is selected from the class consisting of chlorine and bromine.

6. Method as claimed in claim 1 in which said alkoxide has 1 to 6 carbons.

7. Method as claimed in claim 1 in which said dialkyl phosphite is bis(2-chloroethyl) phosphite, said alpha-haloketone is chloroacetone, said alkoxide is sodium ethoxide, said lower aliphatic alcohol is ethanol and said dialkyl 1,2-epoxyalkyl phosphonate is bis(2-chloroethyl) 1,2-epoxypropyl 2-phosphonate.

References Cited

FOREIGN PATENTS 1,046,047  11/1958  Germany.

OTHER REFERENCES

Bulletin of the Academy of Sciences of the USSR, Div. of Chemical Science, No. 1, January 1960, pp. 780–7.

The Journal of General Chemistry of the USSR, vol. 27 (1957), pp. 1093–6.

Houben-Weyl, Methoden der Organischen Chemie, vol. 12/1 (1963), p. 495.

NORMA S. MILESTONE, Primary Examiner

U.S. Cl. X.R.

260—2.5 AR, 2.5 AH, 2.5 AT, 2.5 AC